United States Patent [19]

Bischof et al.

[11] Patent Number: 5,271,695
[45] Date of Patent: Dec. 21, 1993

[54] DEVICE FOR PNEUMATICALLY FEEDING POWDER FROM A CONTAINER

[75] Inventors: Jakob Bischof, Oberburen; Daniel Seiler, Jona, both of Switzerland

[73] Assignee: Gema Volstatic AG, St. Gallen, Switzerland

[21] Appl. No.: 6,679

[22] Filed: Jan. 21, 1993

Related U.S. Application Data

[63] Continuation of Ser. No. 721,164, Jun. 26, 1991, abandoned.

[30] Foreign Application Priority Data

Jul. 7, 1990 [DE] Fed. Rep. of Germany ....... 4021674

[51] Int. Cl.⁵ .............................................. B65G 53/40
[52] U.S. Cl. .................................... 406/114; 406/98; 406/134; 406/143; 406/153
[58] Field of Search ................ 406/32, 38, 96, 98, 406/113, 114, 134, 139, 142, 143, 145, 146, 153, 164

[56] References Cited

U.S. PATENT DOCUMENTS

| | | | |
|---|---|---|---|
| 3,586,215 | 6/1971 | Roche | 406/142 X |
| 4,265,572 | 5/1981 | Bourdois et al. | 406/114 |
| 4,505,623 | 3/1985 | Mulder | 406/114 |

FOREIGN PATENT DOCUMENTS

| | | | |
|---|---|---|---|
| 361383 | 3/1981 | Austria. | |
| 184994 | 6/1986 | European Pat. Off.. | |
| 968932 | 4/1958 | Fed. Rep. of Germany. | |
| 2129644 | 11/1972 | Fed. Rep. of Germany. | |
| 3815222 | 11/1989 | Fed. Rep. of Germany. | |
| 288525 | 11/1989 | Japan | 406/114 |
| 628060 | 10/1978 | U.S.S.R. | 406/146 |

Primary Examiner—David M. Mitchell
Assistant Examiner—Andrew C. Pike
Attorney, Agent, or Firm—Barnes & Thornburg

[57] ABSTRACT

A pipe arrangement (40) consists of two nested pipes (60, 62) and a nozzle head (68, 76) on their bottom ends. This nozzle head is located within the diameter of the pipe arrangement (40) and does not protrude radially beyond its diameter. The pipe arrangement can thus be slipped through a guide opening (7) of a guide device (1) into a container holding powder or can be pulled out completely of the guide opening (7), without a need for disassembly of parts of the device. The guide device (1) contains preferably a container lid (3) that can be set on the container (6). Provided on the pipe arrangement (40) is a stop (44) that can be fastened on said arrangement at various heights and through the adjustment of which the immersion depth of the pipe arrangement (40) in the container can be adjusted.

8 Claims, 2 Drawing Sheets

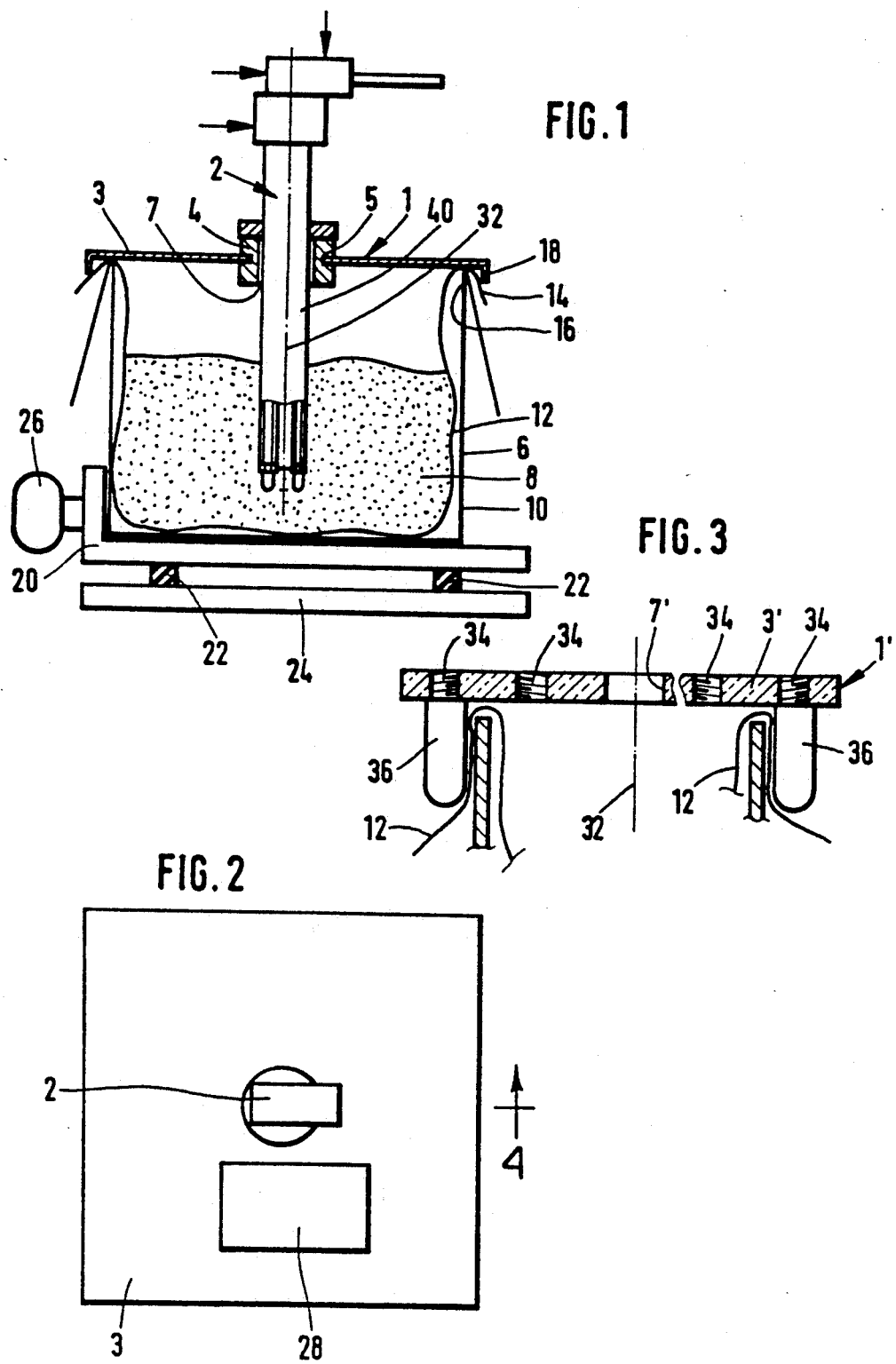

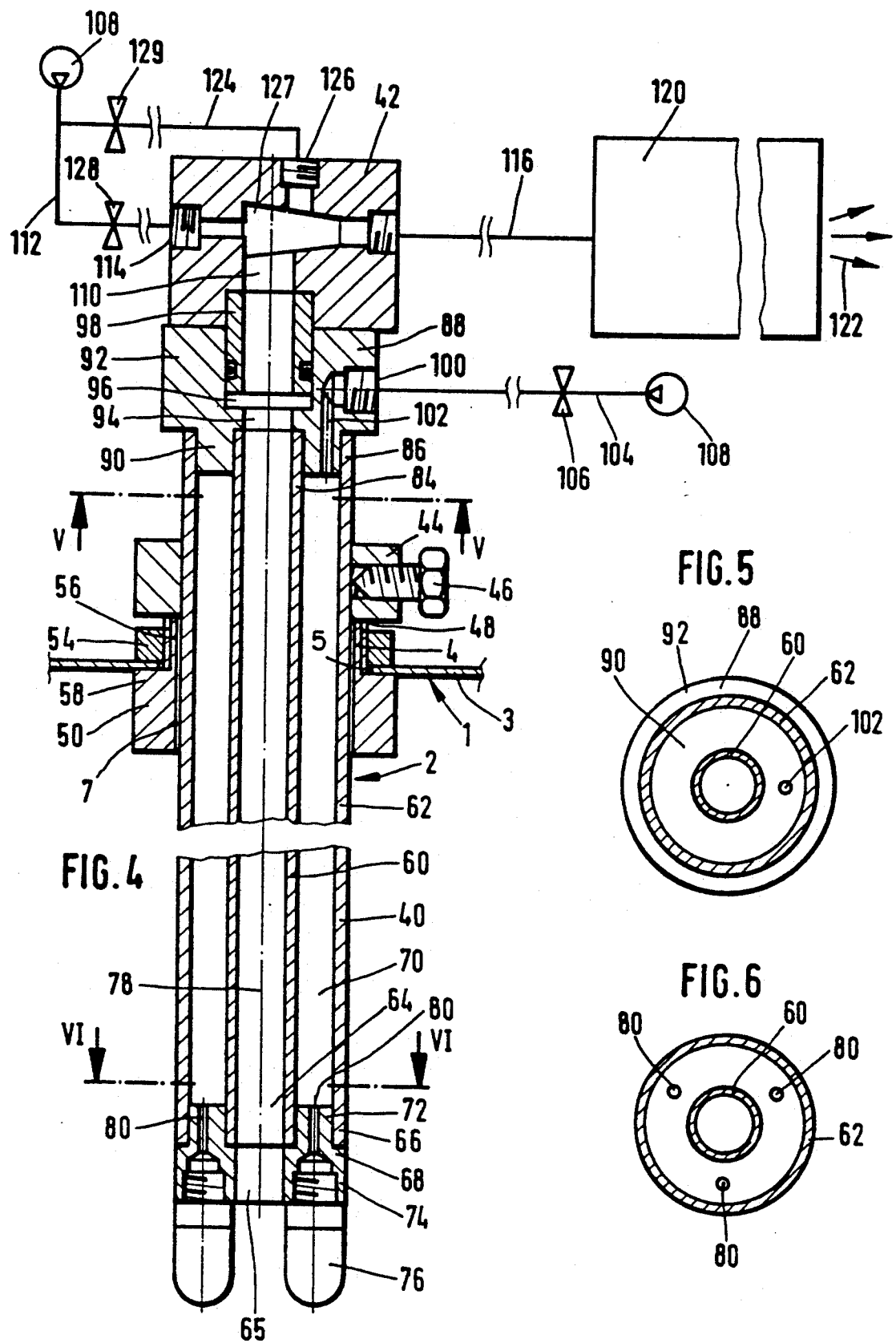

DEVICE FOR PNEUMATICALLY FEEDING POWDER FROM A CONTAINER

This application is a continuation of U.S. Ser. No. 07/721,164, filed Jun. 26, 1991, now abandoned.

BACKGROUND OF THE INVENTION

1. Field of the Invention

The invention concerns a device for pneumatically feeding powder from a container.

2. Description of the Prior Art

Such a device is known from the European patent document 0 184 994 B1. This device serves primarily to pneumatically feed powdery coating material which in a spray coating process is sprayed on articles to be coated. A device of this type makes it possible to withdraw the powder directly from bags, cartons, barrels, boxes etc. and automatically feed it directly to a spray device or spray coating system, without using a fluidizing container or other intermediate container. Before such devices were known the powder had to be transferred into a "fluidizing container" from the shipping containers in which it was delivered by the powder manufacturer to the powder user. Such "fluidizing container" comprises an intermediate bottom which is permeable to air. Through the intermediate bottom, upward from below, flows air in the form of many fine jets fluidizing the powder contained above the intermediate bottom, so that the powder particles "float or hover" in the air flow. This state is called "fluidized powder." This fluidized powder can be withdrawn pneumatically by a suction device and fed to the spray device of a spray coating system. The spray coating device may be a handheld gun or a mechanical gun installed in a spray coating system. The entire spray coating process, including the supply of the powder, can take place automatically. The device of the prior type and the device according to the invention fulfill both the two functions: they fluidize the powder and pneumatically feed it to a point of usage. In the prior device, a suction pipe and a compressed air feed line arranged parallel at a distance beside it extend through the lid of the container. Provided on the end of the compressed air line is an air distribution device featuring oblong air distributing elements from fine-pored material, through which elements the air discharges in the form of fine compressed air jets, fluidizing the powder on the bottom end of the suction pipe. Mounted on the upper end of the suction pipe, above the container lid, is a suction device that withdraws from the container fluidized powder and pneumatically feeds it to the point of usage in a feed air flow, for instance to a spray device of a spray coating system. The compressed air fluidizes the powder in the container not across the entire container cross section, but only in a small limited area below the suction pipe. During the powder withdrawal there is created below the bottom end of the suction tube a cavity into which powder slides continuously from the container. This sliding and thus the continuous filling of the cavity below the suction pipe, and thus also a continuous, uniform powder withdrawal, is improved by vibrating the container by means of a vibrator. Once the container is empty, the air distribution device must be removed from the bottom end of the suction pipe and from the bottom end of the compressed air feed line, the suction pipe and the compressed air line must be pulled out of the container lid, thereafter, both must be reinserted through the lid of a new, filled container, and the air distribution device must be fastened again on both. When different types of coating powder must be successively withdrawn from different containers for the coating of articles, the entire device must be extremely accurately cleaned at every change to a different container, since even the smallest powder residues in the device will adversely affect the coating quality. Upon prolonged operation, however, the device needs to be cleaned also if it has been used for a longer time only for one and the same powder type from different containers, so that no powder remainders will collect within it. Such powder accumulations would clog the flow paths, interfere with a uniform feed rate, and powder accumulations breaking loose would cause paint lumps and thus coating defects on the object being coated.

Known from the European patent document 0 008 270 B1, moreover, is a device for the pneumatic feeding of powder from a container, which device consists of two coaxial pipes of which the inner one is the suction pipe and the outer one a compressed air pipe. Their bottom ends form together an annular gap type nozzle which from the annular space between the two pipes directs compressed air in the form of a downwardly slanted ring-shaped compressed air jet at the cylindrical wall of the container. From the cylindrical container wall, the ring-shaped compressed air jet drives the powder down into the container center, at a slant, and from there into the bottom end of the suction pipe. Thus, unlike in the former device, the fluidization of the powder occurs not only across part of the container cross section but across the entire container cross section. To that end it is necessary for the powder container to have a relatively small, preferably circular cross section. According to the publication, the container of this prior device has a ball type shape and the bottleneck is provided with a threading and hangs on a support, into which the bottleneck is screwed. The tubular arrangement with the two pipes is installed in the support, airtight, coaxially with the container. The objective of this device is making it possible to empty the entire content of the container, without leaving powder remainders on the container wall.

Another device known from the European patent document 0 103 745 B1 as well serves to possibly completely empty the container. The tubular arrangement of the device is for that purpose directed not axially in the center of the container, but essentially diagonally through the container and into the corner of the container bottom. The container is set slanted allowing the powder to slide into this corner. Unlike the two aforementioned devices, this device does not employ compressed air but only a suction pipe. The air withdrawn from the container can be replenished from the surrounding atmosphere through a pipe which coaxially surrounds the suction pipe.

A finely powdered to granular material is to be understood as "powder."

The problem which the invention is intended to solve is to so develop the device of the initially cited European patent document 0 184 994 B1 that it can be slipped without disassembly, i.e., in ready-to-operate, completely mounted condition, through a guide opening providing guidance in the longitudinal direction of the pipe, of a container or other guide device, where the design at the same time should be such that the device features as few as possible spots on which powder may accumulate. At the same time, the device should be so designed that it will not be limited to the use of a specific container type or a certain slanted position or vertical position of a container. Furthermore, the design is to avoid the requirement of an additional support structure or container shape, as for instance in the said European patent document 0 008 270 B1, for the device or for the container. Instead, the device should be able to dip into the container solely by its deadweight, practically under gravity, while the device sucks powder from the container.

According to the invention, a device for pneumatically feeding powder from a powder container comprises a guide device that can be placed on the container and is supported by the container, a pipe arrangement installed axially in a guide opening of the guide device so that the pipe arrangement will penetrate deeper into the container as a powder quantity in the container decreases and, a vibrator vibrating the container. The pipe arrangement includes a suction pipe and a compressed air line having an upper end provided with a fitting for a compressed air supply and a bottom end upon which a nozzle head is provided from which many fine compressed air jets flow into the container, fluidizing the powder in a limited region of the container at a bottom end of the suction pipe. A feed pump is arranged at an upper end of the suction pipe and serves to suck the powder out of the container through the suction pipe. The pipe arrangement in completely assembled and ready-to-operate condition can be slipped from above the guide opening of the guide device into the container and can be completely pulled out of the guide opening without any need for disassembly or assembly of any parts. The compressed air line includes a pipe surrounding the suction pipe at a radial spacing defining an intermediate space. The suction pipe and the compressed air pipe are at their bottom ends mechanically connected with each other through a lower spacer and held spaced. This lower spacer is an element of the nozzle head. The upper ends of the suction pipe and the compressed air pipe are mechanically connected with each other through an upper spacer and kept spaced. The upper spacer is a fitting that supports the feed pump and connects the feed pump pneumatically with the suction pipe. The fitting additionally forms a connection from an external compressed air supply to the intermediate space in the compressed air pipe.

The invention offers the following advantages:

1. The withdrawal device can be slipped from above, through a guide opening of a guide device, specifically through a lid, and pulled out again without requiring the disassembly of parts of the device.

2. The withdrawal device soiled with powder and the lid, soiled with powder as well, need not be removed jointly from the container after it has been emptied, but it is possible to first remove the withdrawal device and then, separately, the lid from the container and clean it as well, which is considerably simpler than removing the lid together with the withdrawal device protruding through it, from the container.

3. The lid serves as a holder and axial guide of the withdrawal device, which is movable relative to the lid, through it.

4. The lid can be used for different containers, so that the powderfilled shipping containers do not need any specific lids of their own.

5. The withdrawal device may selectively be used with differently shaped and differently sized lids.

6. The withdrawal device is preferably arranged in the center of the container, coaxial with its center axis, but the withdrawal device may as well be arranged eccentrically or slanted to the container axis.

7. The suction withdrawal device requires no drive device for feeding it into the container while powder is sucked out, but the deadweight of the withdrawal device is inventionally balanced in such a way with the axially extending guide device of the lid that the withdrawal device will by its deadweight be lowered into the powder while powder is being sucked out. The powder container is preferably vibrated by a vibration device.

8. Several withdrawal devices extending through it may be arranged on the lid.

9. The lid may contain a sight hole for observation of the container content or may consist of transparent material.

The invention will be described hereafter with reference to the drawing, with the aid of several embodiments as examples.

FIG. 1 illustrates a schematic vertical section of a shipping container for powder with a device according to the invention;

FIG. 2 illustrates a plan view of the lid of the container according to FIG. 1;

FIG. 3 illustrates a vertical section of a modified embodiment of a lid of the device according to the invention;

FIG. 4 illustrates a vertical section of a suction withdrawal device according to the invention, taken generally along section lines 4—4 of FIG. 2;

FIG. 5 illustrates a cross section along the plane V—V of FIG. 4; and,

FIG. 6 illustrates a cross section along the plane VI—VI in FIG. 4.

The inventional device illustrated in FIG. 1 consists essentially of a guide device 1 and a suction withdrawal device 2. The guide device 1 comprises guide means 4 with a guide opening 7 through which the withdrawal device 2 extends, is installed in the axial direction of the guide opening 7 and can be moved in axial direction. The guide device 1 can be detachably set on the rim of a container 6 and is supported by it. The part of the guide device 1 supported by the container 6 is preferably a lid 3 with an, e.g, central opening 5 on which the guide means 4 are located. The container 6 is the shipping means in which coating powder 8 for the spray coating of articles is delivered by a powder manufacturer to a powder user. The powder 6 consists for instance of a carton 10 and a plastic bag 12 arranged within it. The bag rim is rolled over the upper rim 16 of the carton outward and is clamped between this carton rim 16 and the lid 3. The lid 3 bears on the bag rim 14 without additional fastening. The lid 3 has a lid rim 18 which protrudes downward and away preventing a sideways displacement of the lid 3 on the container 6, or at least limiting it to a permissible degree. The container 6 is placed on a vibration plate 20 which is supported in horizontally movable fashion by a bottom 24, through spring elements 22, for instance blocks or an elastic ring of rubber. The vibration plate 20 and thus also the powder container 6 and the suction withdrawal device 2 are in customary fashion vibrated by a vibrator 26, i.e., have a shaking motion imparted to them.

The container 6, and with it also the lid 3 adapted in terms of shape, may be circular in cross section or rectangular according to FIG. 2. In keeping with FIG. 2, a sight hole 28 may be provided in the lid 3 for observation of the powder content.

If it is desired to observe the container content, the lid may consist also of transparent material, for instance plexiglass, according to FIG. 3, where the lid is signified by the reference numeral 3'. FIG. 3 illustrates also the other possibility of using as a lid a flat plate-which does not have a lid rim 18. Instead, bores 34, preferably threaded bores, are formed in the lid 3' of FIG. 3 variously spaced from the center axis 32 of the lid, into which bores pins 36 can be inserted or screwed in which substitute for the lid rim 18. By changing the pins 36 to bores having a different spacing from the center axis of the lid it is possible to adapt the lid to various containers 6 that have different diameters or different cross-sectional shapes. An opening 71 formed in this lid 31 has a sufficient length for guiding the suction withdrawal device 2 in the axial direction of the opening. The lid 3 thus forms a guide device 1', and the opening 7' replaces the guide means and their guide opening 7.

According to FIGS. 1, 4, 5 and 6, the inventional suction withdrawal device consists essentially of a pipe arrangement 40, a feed pump 42 fastened on its upper end and supported by it, in the form of a known pneumatic feed device operating by the principle of the injector or venturi tube, and of a stop ring 44 surrounding the pipe arrangement and allowing to be fastened at various levels of the pipe arrangement 40, by means of a set screw 46. This makes it possible to adjust the immersion depth of the pipe arrangement 40 in the container 6, i.e., to adapt the immersion depth of the suction withdrawal device 2 to various container depths. The guide means 4 may consist of a guide ring 50 with a bore 7 providing axial guidance to the pipe arrangement 40, as a guide opening, and of a nut 54. The nut 54 is screwed on a section 56 of the guide ring having a smaller diameter and protruding through the opening 5 of the lid 3 upward out of the lid 3. A diametrically larger section 58 of the guide ring 50 bears from below on the lid 3. The arrangement could also be opposite, with the diametrically larger section 58 bearing from above on the lid 3 while its diametrically smaller section 56 and the nut 54 are located below the lid 3.

The pipe arrangement 40 consists of two radially spaced, preferably coaxially, and nested pipes of which the inner pipe 60 is a suction pipe for the powder intake from the container 6, while the outer pipe 62 is a compressed air pipe feeding compressed air into the container below the bottom end 64 of the suction pipe 60. The pipes 60 and 62 also could be arranged eccentrically to each other. The bottom ends 64 and 66 of the suction pipe 60 and of the compressed air pipe 62 are at an approximately even level. These pipe ends 64 and 66 are mechanically connected with each other through a ring-shaped spacer 68 that features a thinner circular section 72 that protrudes into the annular space 70 between the two pipes 60 and 62 while providing a mutual spacing for the two lower pipe ends 64 and 66. A section 74 of the spacer 68, protruding out of the annular space 70, has a greater radial thickness. Inserted in it are several, for instance three oblong air distribution elements 76, parallel to the longitudinal axis 78 of the pipe arrangement 40, preferably screwed in. The air distribution elements 76 are in flow connection with the annular space 70 through bores 80. The air distribution elements 76 serve to blow compressed air from the annular space 70, in the form of fine, thin air jets, below the lower end 64 of the suction pipe 60 into the container 6, in such a way that powder present in the container will be fluidized not across the entire container cross section, but only across a smaller cross-sectional area of the container below the suction pipe 60. The air distribution elements 76 consist preferably of a fine-pored material which is permeable to compressed air. They also serve as filter elements preventing dirt particles from proceeding from the annular space 70 into the container 6, or powder particles from the container into the annular space 70. The outside diameter of the spacer 78 is also on its heavier section 74 not greater than the outside diameter of the compressed air pipe 62. The outer peripheral surface of the heavier spacer section 74 is preferably flush with the outside surface of the compressed air pipe 62. Neither do the air distribution elements 76 extend beyond this outside diameter of the compressed air pipe 62. This makes it possible to slip the pipe arrangement with the spacer 68 and the air distribution elements 76 through the guide bore 7 of the guide means 4 and into the container, or to pull them completely out of the container through the guide means 4, without the necessity of removing the lid 3 from the container 6 and of disassembling the air distribution elements 76 or the spacer 68. The spacer 68 is at the same time a fitting for connection of the air distribution elements 76 to the annular space 70. The bottom end 64 of the suction pipe 60 communicates with the interior of the container 6 through a central bore 65 in the spacer 68.

The upper end 84 of the suction pipe 60 and the upper end 86 of the compressed air pipe 62 are located approximately at the same level and are mechanically connected with each other through an upper spacer 88. Said upper spacer 88 has a diametrically smaller ring-shape section 90 extending between the two upper pipe ends 84 and 86 into the annular space 70, keeping these ends radially spaced. Moreover, the upper spacer 86 possesses a diametrically larger section 92 that sits on the upper pipe ends 84, 86 and features a central bore 94 which passes axially through the upper spacer 88, communicating with the interior of the suction pipe 60. The central bore 94 of the upper spacer 88 has an expanded outer bore section 96 into which the feed pump 42 is slipped via a socket 98. The feed pump 42 is thus supported by the spacer 88, on which it can bear. The upper spacer 88 is additionally provided with a sideways located compressed air fitting 100, which through a bore 102 through the upper spacer 88 communicates with the annular space 70. The compressed air fitting 100 is hooked to a compressed air supply 108 by means of a pneumatic line 104, in which a shutoff valve or pressure control valve or a pressure controller 106 may be provided. The upper spacer 88 thus serves not only the fastening and spacing of the upper pipe ends 84 and 86, but at the same time also as a hookup and connecting body between the pipe arrangement 40 and the feed pump 42 as well as the compressed air supply 108.

The feed pump 42 is a known pneumatic feed device operating according to the venturi principle or to the injector principle. It has a suction fitting 110 located above the upper end 84 of the suction pipe 60 and sucking powder from the container 6 through the suction pipe 60 as compressed air from a compressed air supply 108 flows through a pneumatic line 112 and a feed air fitting 114 via the suction fitting 110 of the feed pump 42. The compressed air feeds the powder air mixture which it has taken in a point of usage through a powder feed line 116, preferably directly to a spray device 120. The spray device 120 may be any of the known powder spray devices for the coating of articles, spraying the powder in the form of an atomized powder jet 122 on an article to be coated. The spraying may take place in known fashion, electrostatically under high voltage. From a compressed air supply 108, compressed air may be passed into the vacuum area 127 of the pneumatic feed pump 42 through another pneumatic line 124 and a control air fitting 126, in order to control the strength of the vacuum within the pump and thus the powder feed rate, such as known as such. Provided in the pneumatic lines 112 and 124 may be shut-off valves, control valves and/or pressure controllers 128 and 129 enabling an adjustment of the flow rates and pressures, by hand or automatically.

What is claimed is:

1. Device, for pneumatically feeding powder from a powder container, comprising a guide device (1; 1') that can be placed on the container (6) and is supported by the container;

a pipe arrangement (40) installed axially in a guide opening (7; 7') of the guide device (1; 1') so that the pipe arrangement will penetrate deeper into the container as a powder quantity in the container (6) decreases;

a vibrator (26) vibrating the container (6);

a compressed air supply (108);

the pipe arrangement (40) including a suction pipe (60) and a compressed air line (62) having an upper end (86) provided with a connection (100) for the compressed air supply (108) and a bottom end (66) upon which a nozzle head (68, 76) is provided from which many fine compressed air jets flow into the container (6), fluidizing, at a bottom end (64) of the suction pipe (60), the powder in a limited region of the container; and a feed pump (42) arranged at an upper end (84) of the suction pipe (60) and serving the suck the powder out of the container (6) through the suction pipe (60); wherein the pipe arrangement (40) in completely assembled and ready-to-operate condition can be slipped from above through the guide opening (7; 7') of the guide device (1; 1') into the container (6) and can be completely pulled out of the guide opening (7; 7') without any need for disassembly or assembly of any parts;

the compressed air line (62) includes a pipe surrounding the suction pipe (60) at a radial spacing defining an intermediate space (70);

the suction pipe (60) and the compressed air pipe (62) are at their bottom ends (64, 66) mechanically connected with each other through a lower spacer (68) and held spaced;

the lower spacer (68) is an element of the nozzle head (68, 76);

the upper ends (84, 86) of the suction pipe (60) and the compressed air pipe (62) are mechanically connected with each other through an upper spacer (88) and kept spaced; and the upper spacer (88) is a fitting that supports the feed pump (42) and connects the feed pump (42) pneumatically with the suction pipe (60), said fitting additionally forms the connection (100) from the external compressed air supply (108) to the intermediate space (70) in the compressed air pipe (62).

2. Device according to claim 1, wherein the spacers (68, 88) include sections (72, 90) inserted in the intermediate space (70).

3. Device according to claim 1 or 2, wherein the feed pump (42) is mechanically and pneumatically connected through a plug connection (96, 98) with the upper spacer (88) and supported by said upper spacer (88).

4. Device according to claim 1 wherein the nozzle head (68, 76) comprises an air distribution element constructed of fine-pored material providing the many fine compressed air jets flowing into the container (6).

5. Device according to claim 1 wherein the pipe arrangement (40) is provided with a stop (44) which can be fastened on the pipe arrangement (40) at axially different heights and which, depending on axial positioning, limits an immersion depth of the pipe arrangement in the container (6).

6. Device according to claim 1 wherein the guide device (1) includes a lid (3), the lid (3) including a sight hole (28) for observation of an interior of the container (6).

7. Device according to claim 1 wherein the guide device (1') comprises a lid (3') constructed at least partly of transparent material.

8. Device according to claim 1 wherein the guide device (1') comprises side stops (36) which bear sideways on the container (6), thereby preventing sideways shifting of the guide device (1'), and wherein the side stops (36) can be detachably fastened on said guide device (1') at various distances from one another and from a center (32) of the guide device (1').

* * * * *